United States Patent [19]
Djuknic et al.

[11] Patent Number: 5,974,317
[45] Date of Patent: Oct. 26, 1999

[54] CELL-CLUSTERING ARRANGEMENTS AND CORRESPONDING ANTENNA PATTERNS FOR WIRELESS COMMUNICATION NETWORKS EMPLOYING HIGH-ALTITUDE AERONAUTICAL ANTENNA PLATFORMS

[75] Inventors: Goran M. Djuknic, Jersey City; Diane Yuh-Lin Hou, Warren; Yuriy B. Okunev, Dover, all of N.J.

[73] Assignee: Lucent Technologies, Inc., Murray Hill, N.J.

[21] Appl. No.: 08/745,381

[22] Filed: Nov. 8, 1996

[51] Int. Cl.$^6$ .................... H04Q 7/36; H01Q 1/28
[52] U.S. Cl. .................. 455/431; 343/705; 343/706
[58] Field of Search ................... 455/429, 431, 455/449; 370/316; 342/352, 353, 367; 343/705, 706, DIG. 2

[56] References Cited

U.S. PATENT DOCUMENTS

| | | | |
|---|---|---|---|
| 5,459,759 | 10/1995 | Schilling | 375/202 |
| 5,551,060 | 8/1996 | Fujii et al. | 455/447 |
| 5,697,050 | 12/1997 | Wiedeman | 455/429 |

FOREIGN PATENT DOCUMENTS 56-72547   6/1981   Japan.

*Primary Examiner*—Andrew M. Dolinar

[57] ABSTRACT

A multi-beam antenna for a wireless communication network, a method of creating cells for a wireless communication network with a multi-beam antenna held aloft by an aeronautical vehicle and a wireless infrastructure. The multi-beam antenna projects: (1) a first antenna beam to create a first cell upon a generally circular first terrestrial area below the multi-beam antenna and (2) a second antenna beam to create a second cell upon a generally circular second terrestrial area below the multi-beam antenna, the first cell having a smaller radius than, and substantially concentric with, the second cell.

20 Claims, 3 Drawing Sheets

CELL-CLUSTERING ARRANGEMENTS AND CORRESPONDING ANTENNA PATTERNS FOR WIRELESS COMMUNICATION NETWORKS EMPLOYING HIGH-ALTITUDE AERONAUTICAL ANTENNA PLATFORMS

TECHNICAL FIELD OF THE INVENTION

The present invention is directed, in general, to wireless communication systems and, more specifically, to cell-clustering arrangements and corresponding antenna patterns for such wireless communication networks that employ high-altitude aeronautical antenna platforms.

BACKGROUND OF THE INVENTION

The use of cellular mobile telecommunications has undergone substantial growth over the past few years and is projected to continue expanding as service is improved and new products and features are offered. To retain existing customers and entice others to adopt cellular telecommunications, however, services must be provided at a reasonable price. Therefore, the cost of providing cellular telecommunication services must be reduced.

Conventional terrestrial-based cellular systems provide service to geographical areas divided into hexagonal cells 110 as shown in FIG. 1. The number and size of these cells are selected by the service provider such that geographical coverage is optimized, cost is reduced, and capacity within the service area is maximized. Each cell 110 is equipped with transmitters, receivers, and control apparatus located at a cell site 120, which is typically located near the geographical center of the cell. Each cell site 120 within a particular service area is connected to a central office 130 that serves as a mobile telephone switching office (MTSO) and which controls mobile operation within the cells. The cell-sites 120 connect to the MTSO over data links 125. The MTSO switches calls to other mobile units and to the local telephone system.

As a practical matter, cell boundaries are not precise. The conventional hexagonal cell shape was chosen because it provides a practical way of covering an area without the gaps and overlaps in coverage that would occur if circular cells were used. Although circular cells could be serviced by omni-directional antennas, directional antennas must be used to approximate the hexagonal shape.

Because of the above, and other, limitations of conventional terrestrial-based cellular systems, researchers have begun to design wireless communications systems that use high-altitude aeronautical platforms (HAAP) to carry radio-relay transponders. A HAAP can take, for example, the form of an airship or a piloted, or pilotless, airplane circling over a geographical service area. One advantage of an airborne antenna platform is that it can service a much larger geographical area than conventional terrestrial-based cellular antenna systems.

Attempts to realize an operational HAAP have heretofore relied on geographical service areas divided into conventional adjacent hexagonal cells. The use of conventional cells, however, requires that the HAAP on-board antenna be capable of dynamically changing its radiation pattern as the aeronautical vehicle flies in a circle above the service area. This is because the relative position between each hexagonal cell and the HAAP is not constant and, thus, the antenna beam must be mechanically and/or electronically steerable, which adds cost and complexity to a cellular system employing HAAP-mounted antennas. Thus, from the wireless point of view, the most challenging technical issue in realizing such systems is the sophisticated, steerable multi-beam antennas required onboard the HAAP.

Accordingly, what is needed in the art, is a way of clustering cells that does not require steerable-beam antennas.

SUMMARY OF THE INVENTION

To address the above-discussed deficiencies of the prior art, the present invention provides a multi-beam antenna for a wireless communication network, a method of creating cells for a wireless communication network with a multi-beam antenna held aloft by an aeronautical vehicle, and a wireless infrastructure. The multi-beam antenna projects: (1) a first beam to define a first cell upon a generally circular first terrestrial area below the multi-beam antenna and (2) a second beam to define a second cell upon a generally circular second terrestrial area below the multi-beam antenna, the first cell having a smaller radius than, and substantially concentric with, the second cell. Any number of cells may be defined by projecting additional beams from the multi-beam antenna.

The present invention therefore introduces a cell-clustering scheme wherein cells are concentrically arranged, one inside another. This is in contrast with the conventional cell-clustering scheme, wherein cells never completely surround one another. One of the advantages of the cell-clustering scheme of the present invention is that, should the a multi-beam antenna begin to orbit horizontally about a centerpoint of the first cell at a generally-uniform radius (such as could occur if the aeronautical vehicle were an airplane), the location and size of the first and second cells remain independent of the orbital position of the multi-beam antenna. This eliminates the need to steer the beams and substantially diminishes the complexity of the multi-beam antenna as a whole.

In one embodiment of the present invention, the multi-beam antenna is held aloft substantially directly above a centerpoint of the first cell. In an alternate embodiment, the multi-beam antenna orbits above a centerpoint of the first cell at a substantially constant orbital radius therefrom. A helicopter or stationary airship can hold the multi-beam antenna aloft in a single location, assuming that atmospheric conditions do not prevent the vehicle from maintaining a relatively stable position. Although an airplane must stay in motion to stay aloft, as long as the airplane assumes a generally horizontal circular orbit about the centerpoint of the cell cluster, the beams emanating from the multi-beam antenna do not require steering.

In one embodiment of the present invention, the multi-beam antenna projects oblique conical beams to define concentric cells, respectively, an eccentricity of the oblique conical beams being a function of an orbital radius of the multi-beam anitenna from a centerpoint of the concentric cells and a relative altitude of the mtdti-beam antenna. If the multi-beam antenna is directly above the centerpoint, the conical beams are right cones. As the multi-beam antenna moves from the centerpoint in its orbit, the conical beams preferably become more oblique, allowing the projection of the beams on the ground below to remain generally circular in shape.

In one embodiment of the present invention, a radius of a second cell ($r_2$) is related to a radius of a first cell ($r_1$) by the equation: $r_2 = r_1 \sqrt{2}$. In this configuration, the area uniquely covered by the second cell (that portion of the second terrestrial area that does not intersect the first terrestrial area) is made equal to the area covered by the first cell (the entirety of the first terrestrial area). This produces cells of substantially equal area. Assuming that mobile stations are more or less evenly distributed, wireless traffic is therefore more or less evenly divided between the first and second cells.

In one embodiment of the present invention, in addition to the multi-beam antenna, there is an antenna that provides feeder-band communication with a ground station of the wireless communication network, the ground station located proximate a centerpoint of the concentric cells. Locating the ground station at the centerpoint substantially eliminates Doppler effects that may occur if the multi-beam antenna is orbiting the centerpoint. The broad scope of the present invention does not limit the ground station positionally. Conventionally, the "feeder-band" is defined as including the Ku-band (12 to 18 GHz). Other frequency bands are certainly within the broad scope of the present invention.

In one embodiment of the present invention, the first and second beams are user-band beams. Conventionally, the "user-band" is defined as the L-band (2 to 4 GHz) and the less than 1 GHZ band (frequencies conventionally employed in cellular telephones or personal communication systems ("PCS")). Other frequency bands are certainly within the broad scope of the present invention.

In one embodiment of the present invention, the aeronautical vehicle is selected from the group consisting of (1) a dirigible, (2) an airplane, (3) an airship and (4) a helicopter. The multi-beam antenna may also be held aloft by a satellite. As new technologies emerge for holding multi-beam antennas aloft, those of skill in the art will perceive the applicability of those technologies to the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction within the accompanying drawings, in which.

DETAILED DESCRIPTION

Figure 1:
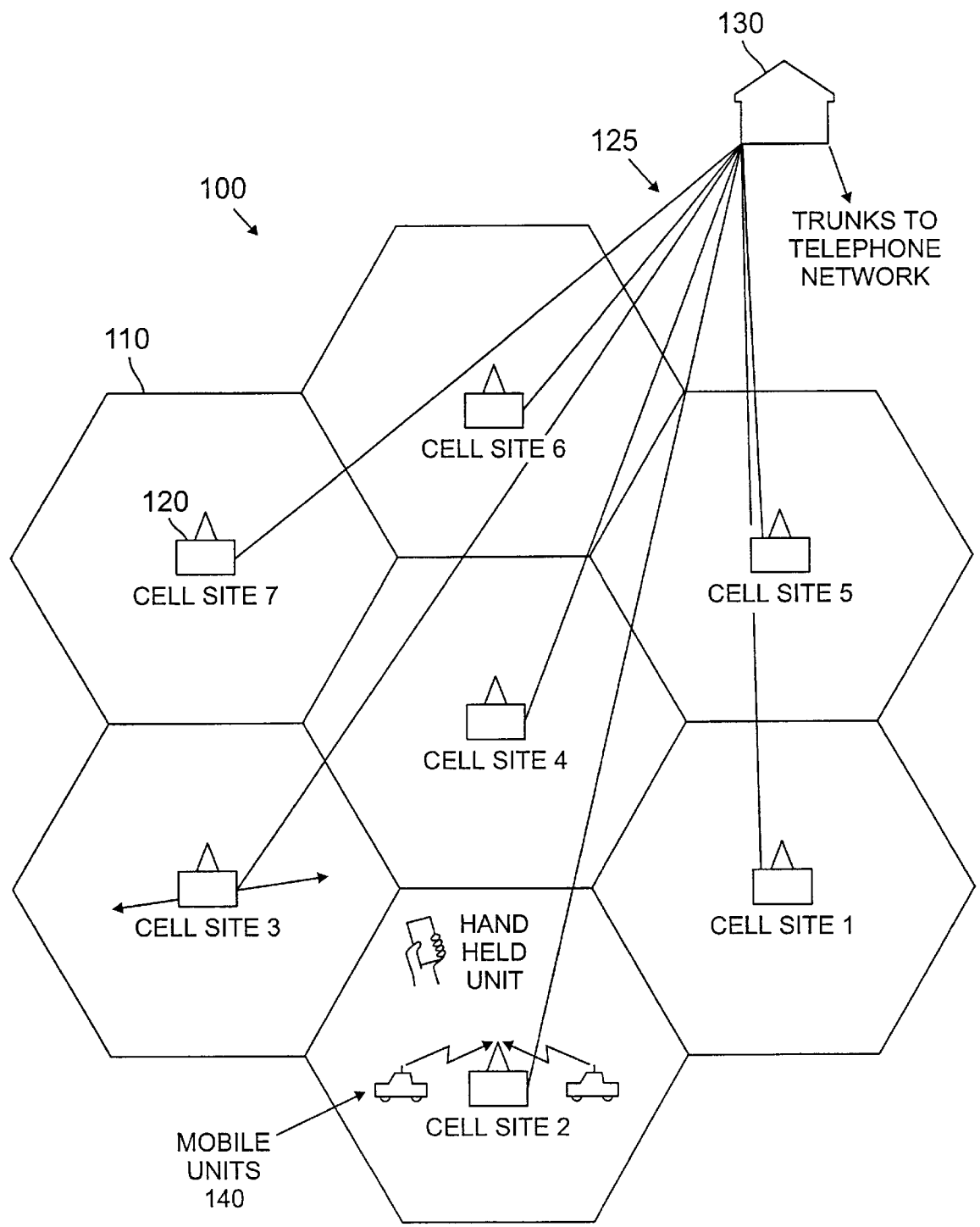
FIG. 1 illustrates a terrestrial-based cellular communications network employing conventional hexagonal-shaped cells.

Referring initially to FIG. 1, illustrated is a terrestrial-based cellular communications network 100 employing conventional hexagonal-shaped cells 110. Each cell 110 is equipped with an antenna array located at a cell site 120, which is typically located near the geographical center of the cell. Each cell site 120 within a particular service area is connected to a central office 130 that serves as a mobile telephone switching office (MTSO) and which controls the operation of mobile units 140 within the cells 110. The cell-sites 120 connect to the MTSO over data links 125. The MTSO switches calls to other mobile units 140 and to the local telephone system (not shown).

Figure 2:
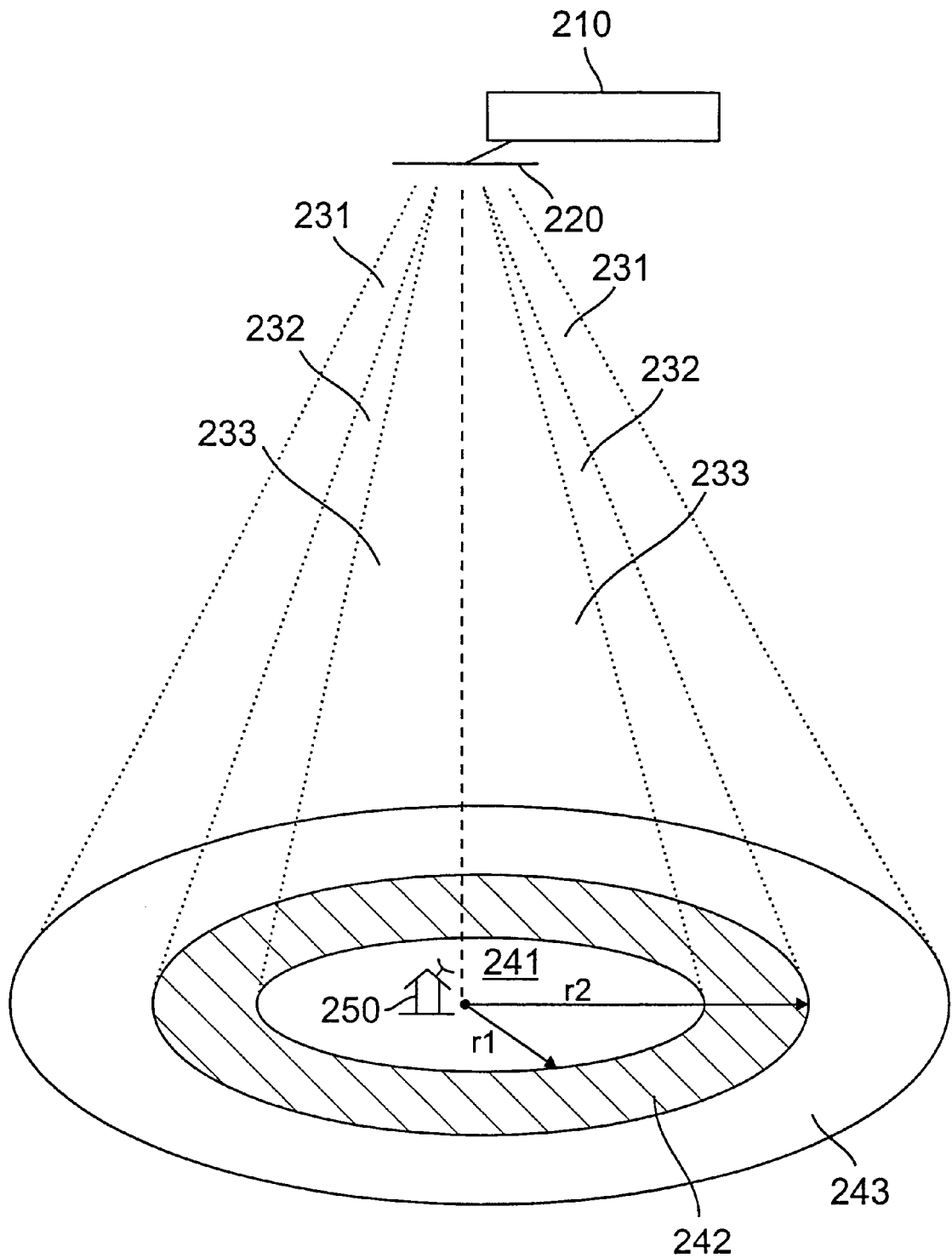
FIG. 2 illustrates a cell-clustering arrangement and corresponding antenna patterns for a wireless communication network that employs a multi-beam antenna held aloft by an aeronautical vehicle.

Turning now to FIG. 2, illustrated is a cell-clustering arrangement and corresponding antenna patterns for a wireless communication network that employs a multi-beam antenna held aloft by an aeronautical vehicle. The present invention overcomes the difficulty of using conventional hexagonal cell shapes with non-terrestrial cellular communications systems. The use of conventional cells with an antenna held aloft by an aeronautical vehicle requires that the antenna be capable of dynamically changing its radiation pattern as the vehicle flies above the service area. This is because the relative position between each cell and the vehicle is not constant and, thus, the antenna beam must be mechanically and/or electronically steerable, which adds cost and complexity to a cellular system. Thus, from the wireless point of view, the most challenging technical issue in realizing such non-terrestrial systems is the sophisticated and steerable multi-beam antennas required.

The present invention discloses a multi-beam antenna 220 mounted to a high-altitude aeronautical platform (HAAP) 210. The multi-beam antenna 220 projects: (1) a first antenna beam 231 to create a first cell 241 upon a generally circular first terrestrial area below the multi-beam antenna and (2) a second antenna beam 232 to create a second cell 242 upon a generally circular second terrestrial area below the multi-beam antenna. The first cell 241 has a smaller radius than, and is substantially concentric with, the second cell 242. Additionally, the first (innermost) cell 241, although illustrated as having a circular shape, may be considered as a ring having an inner radius equal to zero. Those of skill in the art will recognize that, to avoid gaps in coverage, the outer radius of each cell should be substantially coextensive with the inner radius of the adjacent outer cell.

The multi-beam antenna 220 may further project a third antenna beam 233 to create a third cell 243 upon a generally circular third terrestrial area below the multi-beam antenna. Although only three cells 241, 242, 243 are illustrated in FIG. 1, those of skill in the art will recognize that the principles of the present invention may be exterided to any number of concentric cells.

Those of skill in the art will recognize that if the outer radius of the second cell ($r_2$) is related to the outer radius of the first cell ($r_1$) by the equation: $r_2 = r_1\sqrt{2}$, the area uniquely covered by the second cell (that portion of the second terrestrial area that does not intersect the first terrestrial area) will be equal to the area covered by the first cell (the entirety of the first terrestrial area). This relationship may be extended to any number of cells by satisfying the relationship $r_n = r_1\sqrt{n}$ (where $r_1$ is equal to the radius of the innermost (circular) cell) for each $n^{th}$ (ring-shaped) cell, whereby all cells will have the same area. Assuming that mobile stations are geographically evenly distributed, wireless traffic will be more or less evenly divided between the first and second cells.

In one embodiment of the present invention, the multi-beam antenna is held aloft substantially directly above the centerpoint 260 of the first cell 241. It should be recognized that centerpoint 260 of the first cell 241 is also the centerpoint for all other circular cells concentric with the first cell 241. In an alternate embodiment, the multi-beam antenna orbits above centerpoint 260 at a substantially constant orbital radius therefrom. A dirigible, helicopter or stationary airship can hold the multi-beam antenna 220 aloft in a single location, assuming that atmospheric conditions do not prevent the vehicle from maintaining a relatively stable position. Although an airplane must stay in motion to stay aloft, as long as the airplane assumes a generally horizontal, circular orbit about the centerpoint 260 of the cell cluster, the beams 231, 232, 233 emanating from the multi-beam antenna 220 do not require steering, Those of skill in the art will recognize that if the HAAP 210 is held stationary above the centerpoint 260 of the cell cluster, the antenna beams 231, 232, 233 form right cones. If the HAAP 210 is orbiting about the centerpoint 260, however, the antenna beams 231, 232, 233 of the multi-beam antenna 220 must form oblique conical beams in order to define substantially circular cells where the antenna beams 231, 232, 233 intersect the earth's surface. The required eccentricity of the oblique conical beams will be a function of the orbital radius of the multi-beam antenna 220 from the centerpoint 260 of the cell cluster and the relative altitude of the multi-beam antenna. As the multi-beam antenna 220 moves away from the centerpoint 260 in its orbit, the conical beams preferably become more oblique, allowing the projection of the beams on the ground below to remain generally circular in shape.

The multi-beam antenna 220 may also include an antenna that provides feeder-band communication with a ground station 250 of the wireless communications network. The "feeder-band" conventionally used in wireless communications systems is defined as including the Ku-band (12 to 18 GHz). Other frequency bands are certainly within the broad scope of the present invention. Those of skill in the art will recognize that the ground station 250 is preferably located proximate the centerpoint 260 of the cell cluster. Whereas a HAAP 210 orbiting about a ground station 250 located at the centerpoint 260 maintains a relatively fixed distance from the ground station 250, Doppler effects that would occur if the multi-beam anteuna 220 were continuously moving toward or away from the ground station 250 are substantially eliniated. Doppler compensation is required, however, if the ground station 250 is not located at substantially the centerpoint 260. One ground station 250, however, may support more than one HAAP 210, in which case Doppler compensation will be required for at least one HAAP 210. The ground station 250 provides an interface other mobile users, as well as an interface to the public switched telephone network (not shown).

The first and second antenna beams 231, 232 are preferably user-band beams that provide communications to mobile units (not shown). Conventionally, the "user-band" is defined as the L-band (2 to 4 GHz) and the less than 1 GHZ band (frequencies conventionally employed in cellular telephones or personal communication systems ("PCS")). Those of skill in the art will recognize that other frequency bands are certainly within the broad scope of the present invention.

Figure 3:
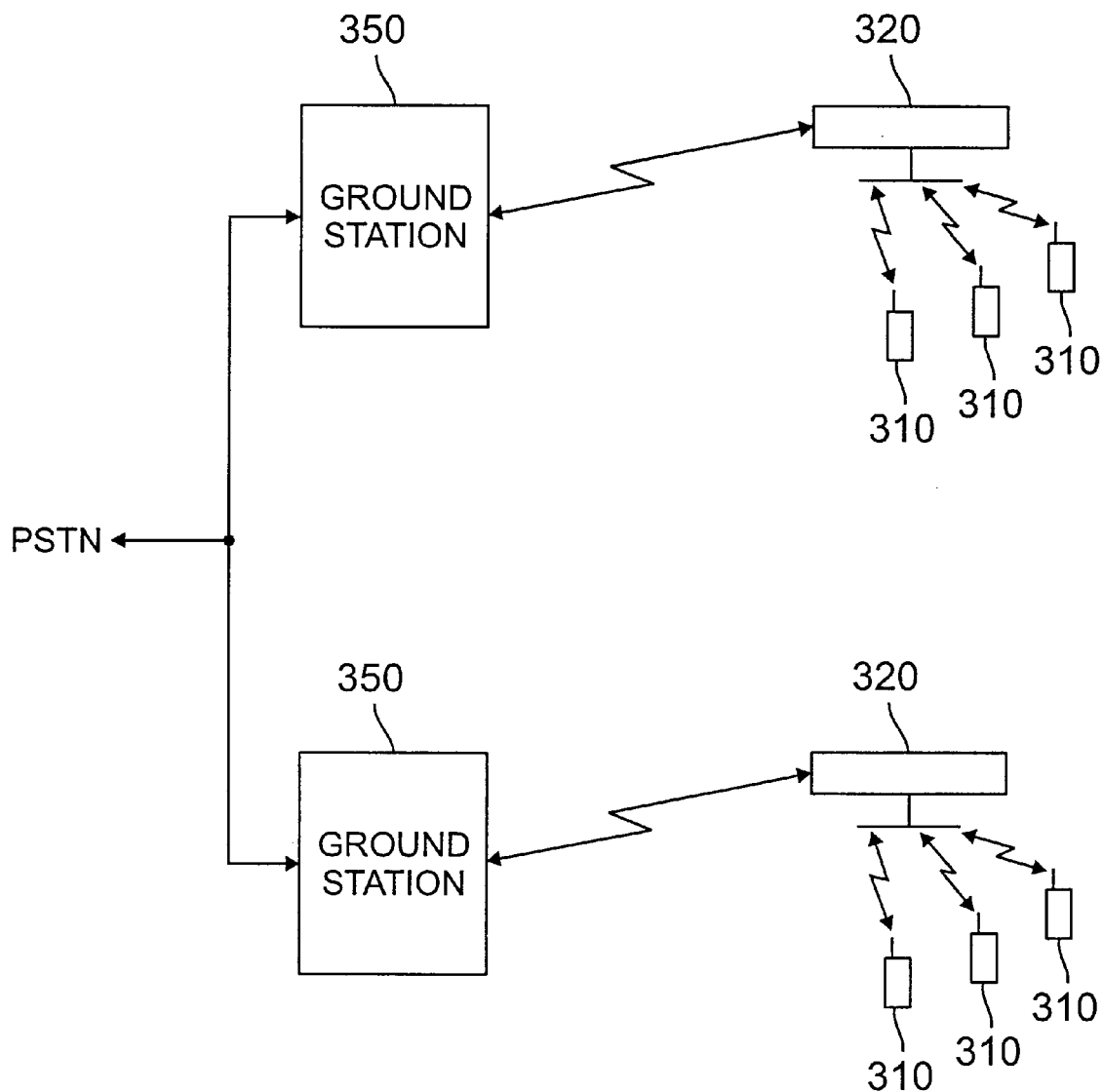
FIG. 3 illustrates a system diagram of a wireless infrastructure employing a plurality of high-altitude aeronautical antenna platforms.

Turning now to FIG. 3, illustrated is a system diagram of a wireless infrastructure employing a plurality of high-altitude aeronautical antenna platforms. The system includes one or more HAAP/multi-beam antennas 320 that provide wireless communications with mobile units 310 as described supra. Each HAAP/multi-beam antenna 320 also receives and sends wireless communications from and to a ground station 350. The ground stations 350 are connected to the public switched telephone network (PSTN), thus providing for communications between mobile units 310 and traditional wired communications devices (not shown). As noted previously, one ground station 350 may support more than one HAAP/multi-beam antenna 320; although if orbiting vehicles are used, Doppler correction may be required. Those of skill in the art will also recognize that each HAAP/multi-beam antenna 320 may communicate with more than one ground station 350. The ability of a HAAP/multi-beam antenna 320 to communicate with more than one ground station 350 would allow mobile-to-mobile communications, between different HAAP service areas, without the need to use the public switched telephone network.

Although the present invention has been described in detail, those skilled in the art should understand that they can make various changes, substitutions and alterations herein without departing from the spirit and scope of the invention in its broadest form.

What is claimed is:

1. A multi-beam antenna for a wireless communication network, said multi-beam antenna held aloft by an aeronautical vehicle, said multi-beam antenna projecting:

a first antenna beam that creates a first cell upon a generally circular first terrestrial area below said multi-beam antenna; and a second antenna beam that creates a second cell upon a generally circular second terrestrial area below said multi-beam antenna, said first cell having a smaller radius than, and substantially concentric with, said second cell, said first and second antenna beams substantially occupying said generally circular first and second terrestrial areas, respectively.

2. The multi-beam antenna as recited in claim 1 wherein said multi-beam antenna is held aloft substantially directly above a centerpoint of said first cell.

3. The multi-beam antenna as recited in claim 1 wherein said multi-beam antenna orbits above a centerpoint of said first cell at a substantially constant orbital radius therefrom.

4. The multi-beam antenna as recited in claim 1 wherein said first and second antenna beams form oblique conical beams to project said first and second cells, respectively, an eccentricity of said oblique conical beams being a function of an orbital radius of said multi-beam antenna from a centerpoint of said first cell and a relative altitude of said multi-beam antenna.

5. The multi-beam antenna as recited in claim 1 wherein a radius of said second cell ($r_2$) is related to a radius of said first cell ($r_1$) by the equation:

$$r_2 = r_1\sqrt{2}.$$

6. The multi-beam antenna as recited in claim 1 further comprising an antenna that provides feeder-band communication with a ground station of said wireless communication network, said ground station located proximate a centerpoint of said first cell.

7. The multi-beam antenna as recited in claim 1 wherein said first and second antenna beams are user-band beams.

8. A method of creating cells for a wireless communication network with a multi-beam antenna held aloft by an aeronautical vehicle, said method comprising the steps of:

holding said multi-beam antenna aloft;

projecting a first beam to create a first cell upon a generally circular first terrestrial area below said multi-beam antenna; and projecting a second beam to create a second cell upon a generally circular second terrestrial area below said multi-beam antenna, said first cell having a smaller radius than, and substantially concentric with, said second cell, said first and second antenna beams substantially occupying said generally circular first and second terrestrial areas, respectively.

9. The method as recited in claim 8 wherein said step of holding comprises the step of holding said multi-beam antenna aloft substantially directly above a centerpoint of said first cell.

10. The method as recited in claim 8 wherein said step of holding comprises the step of orbiting said multi-beam antenna above a centerpoint of said first cell at a substantially constant orbital radius therefrom.

11. The method as recited in claim 8 wherein said steps of projecting each comprise the step of projecting oblique conical beams, an eccentricity of said oblique conical beams being a function of an orbital radius of said multi-beam antenna from a centerpoint of said first cell and a relative altitude of said multi-beam antenna.

12. The method as recited in claim 8 wherein a radius of said second cell ($r_2$) is related to a radius of said first cell ($r_1$) by the equation:

$$r_2 = r_1 \sqrt{2}.$$

13. The method as recited in claim 8 further comprising the step of providing feeder-band communication with a ground station of said wireless communication network, said ground station located proximate a centerpoint of said first cell.

14. The method as recited in claim 8 wherein said first and second beams are user-band beams.

15. A wireless infrastructure for communicating with a plurality of mobile stations, comprising:
   a plurality of ground stations coupled together for communication therebetween; and
   a plurality of high-altitude aeronautical platforms (HAAPs), each of said plurality of HAAPs including:
      an aeronautical vehicle;
      a feeder-band antenna that provides communication with at least one of said plurality of ground stations; and
      a multi-beam user-band antenna, said multi-beam antenna projecting:
         a first antenna beam to create a first cell upon a generally circular first terrestrial area below said multi-beam antenna and to communicate with ones of said plurality of mobile stations, and
         a second antenna beam to create a second cell upon a generally circular second terrestrial area below said multi-beam antenna and to communicate with others of said plurality of mobile stations, said first cell having a smaller radius than, and substantially concentric with, said second cell, said first and second antenna beams substantially occupying said generally circular first and second terrestrial areas, respectively.

16. The wireless infrastructure as recited in claim 15 wherein said multi-beam antenna is held aloft substantially directly above a centerpoint of said first cell.

17. The wireless infrastructure as recited in claim 15 wherein said multi-beam antenna orbits above a centerpoint of said first cell at a substantially constant orbital radius therefrom.

18. The wireless infrastructure as recited in claim 15 wherein said first and second antenna beams form oblique conical beams to project said first and second cells, respectively, an eccentricity of said oblique conical beams being a function of an orbital radius of said multi-beam antenna from a centerpoint of said first cell and a relative alitude of said multi-beam antenna.

19. The wireless infrastructure as recited in claim 15 wherein a radius of said second cell ($r_2$) is related to a radius of said first cell ($r_1$) by the equation:

$$r_2 = r_1 \sqrt{2}.$$

20. The wireless infrastructure as recited in claim 15 wherein said aeronautical vehicle is selected from the group consisting of:
   a dirigible,
   an airplane,
   an airship, and
   a helicopter.

* * * * *